United States Patent

[11] 3,614,334

[72] Inventor Duane J. Bonvallet
Milford, Mich.
[21] Appl. No. 696,588
[22] Filed Nov. 12, 1957
[45] Patented Oct. 19, 1971
[73] Assignee The United States of America as represented by the Secretary of the Army

[54] TELEPHONE MONITOR
10 Claims, 2 Drawing Figs.

[52] U.S. Cl. .......... 179/107, 179/100, 179/101
[51] Int. Cl. .......... H04m 1/24
[50] Field of Search .......... 179/107, 100, 101

*Primary Examiner*—Rodney D. Bennett, Jr.
*Assistant Examiner*—Daniel C. Kaufman
*Attorney*—Harry M. Saragovitz

ABSTRACT: In a telephone monitoring means for connection between a service line and a telephone instrument, said telephone instrument including a cradle and a handset having a microphone: an energizing means, and means for simultaneously disconnecting said microphone from said service line and for connecting said microphone to said energizing means while said handset is on said cradle, so that crosstalk and line noise present in said service line are not transmitted to said microphone during monitoring.

INVENTOR,
DUANE J. BONVALLET

BY Harry M. Saragovitz
ATTORNEY.

TELEPHONE MONITOR

The described herein may be manufactured and used by or for the Government for governmental purposes, without the payment of any royalty thereon.

This invention relates to a telephone monitor and more particularly to a telephone monitor for monitoring conversation and other sound in the vicinity of the telephone microphone while the microphone handset is on the cradle as well as monitoring ordinary telephone conversation when the handset is removed from the cradle.

One of the major difficulties encountered in the monitoring of a telephone microphone while the handset is on the cradle is the excessive amount of crosstalk and line noise present; in many instances, this line noise is sufficient to render the monitored conversation or other sound completely unintelligible. The present invention eliminates this difficulty by completely disconnecting the telephone from the line when the handset is on the cradle and automatically placing the telephone back on the line when the handset is lifted or when a ringing signal is placed on the line.

It is therefore an object of this invention to provide an improved telephone monitor in which the effects of crosstalk and line noise are eliminated.

The exact nature of this invention as well as other objects and advantages thereof will be readily apparent from consideration of the following specification relating to the annexed drawing in which.

Figures 1, 2:
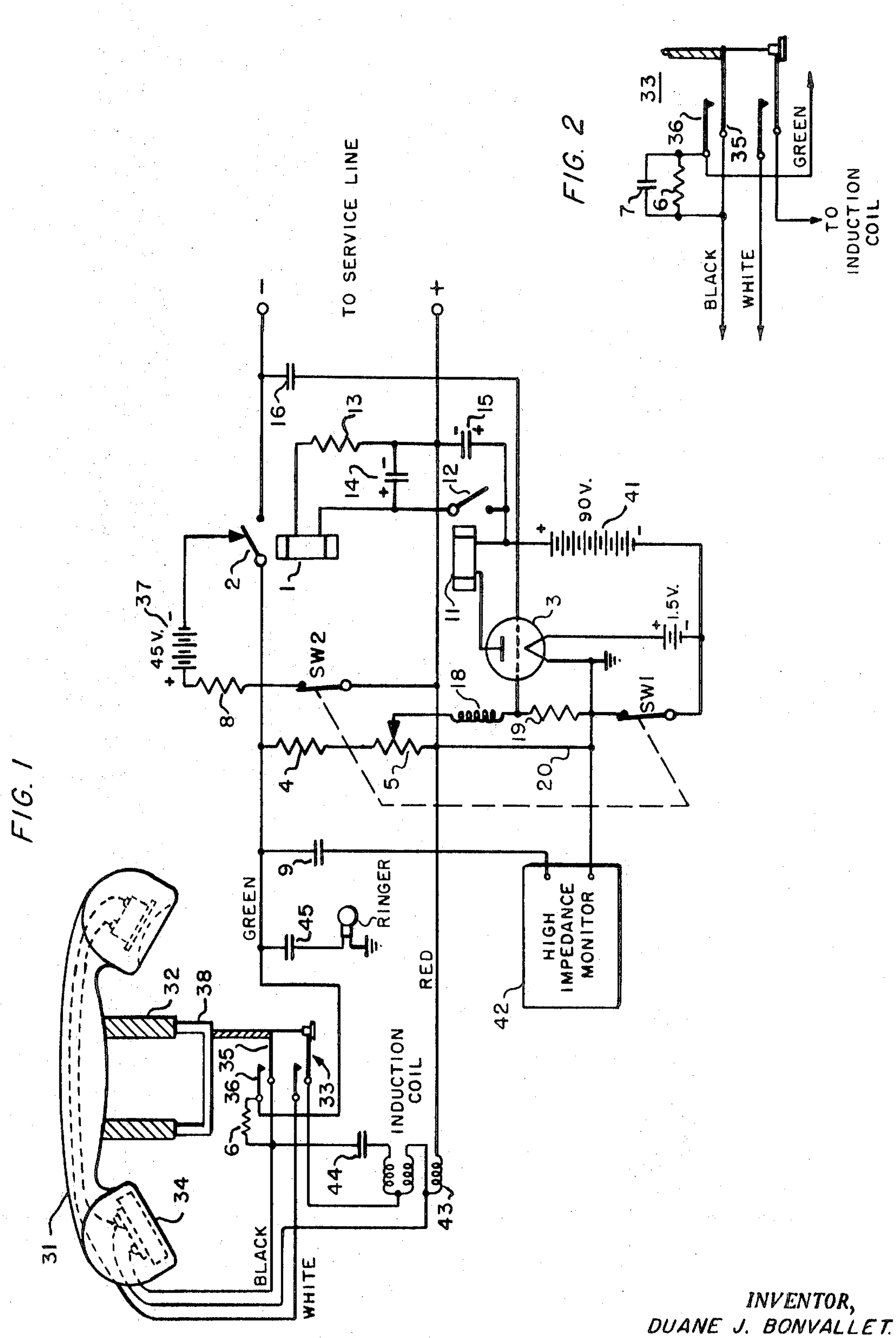
FIG. 1 is a schematic circuit diagram of a conventional telephone connected to the improved telephone monitor equipment of this invention.
FIG. 2 is a schematic diagram of a modification of the hookswitch circuit.

Referring now to the drawing, wherein like reference characters designate like or corresponding parts throughout the figures, there is shown in FIG. 1 the lines leading to a monitored telephone instrument, a high impedance monitor and lines leading to the service line, all as labeled in the drawing. The lines leading to the monitored telephone instrument are designated as green and red, as shown. A main switching relay consisting of a coil 1 and switch arm 2 is provided to break one side of the service line in order to accomplish the open circuit condition while the handset 31 of the monitored telephone instrument remains on 32. Switch arm 2 is normally spring biased in the position shown and ganged switches SW1 and SW2 are closed. In the normal condition of the circuit, the handset is on the cradle, coil 1 is deenergized and switch arm 2 places a 45-volt negative bias on the monitored telephone to energize the carbon microphone 34 in the telephone handset 31. The circuit is shown in this condition. It is necessary to place a suitable bypass resistor 6 across one circuit of the hook switch 33 of the telephone to provide a proper bias for the microphone 34. It is understood that the base circuitry of the monitored telephone instrument, including induction coil 43, the ringer, capacitor 44, ringing capacitor 45, the handset and the hook switch is conventional and forms no part of the subject matter of this invention. A bypass resistor 6 is connected in the hook or cradle switch 33 across the terminals 35, 36. If a bias battery 37 of 45 volts is used as shown in FIG. 1, a suitable value for resistor 6 will be 10,000 ohms. This resistor can be installed right in the base with open leads; however, it is apparent that this arrangement is easily detected. One means of hiding the resistor to prevent detection is by disassembling the cradle contact assembly of hook switch 33 and installing the resistor in the separating insulator. This can be done by drilling a hole through the insulator and painting in the resistor with printed-circuit resistance paint. When the cradle assembly of hook switch 33 is thereafter rebuilt, it will be impossible to visually detect the resistor. In addition, if concealment is not critical, a small mica capacitor 7 will give improved results when connected directly across resistor 6 as shown in FIG. 2. The capacitor 7, if used, will offer a much lower impedance to the audio signal from the telephone without affecting the DC bias.

Referring again to FIG. 1, a triode designated 3 is provided, the grid bias for the grid of triode 3 being obtained from the voltage divider network consisting of resistors 4 and 5. The resistor 5 is in the form of a potentiometer in order to provide for adjustability of the bias. To utilize the monitor, ganged switches SW1 and SW2 are closed. It is to be recalled that FIG. 1 shows the condition of the circuit with the handset on the cradle. The handset in this position holds actuator 38 down, opening the contacts of hook switch 33. With the circuit in this condition, it is seen that the high impedance monitor 42 is connected across the telephone instrument lines and any sound occurring in the vicinity of the instrument will be monitored by a suitable instrument, which could be a high impedance amplifier or recorder or the like. Capacitor 9 is placed in the monitor line in order to isolate the DC bias. Since the service line is disconnected due to the normal deenergized condition of relay coil 1, any crosstalk or line noise present on this line will not be transmitted to the monitoring instrument.

When the handset is lifted from the cradle, resistor hook switch actuator 38 rises, allowing the contacts of the cradle assembly of hook switch 33 to make electrical contact. As terminals 35 and 36 make electrical contact, 6 in the telephone base is shorted, placing the full 45-volt bias of the battery 37 on the telephone's carbon microphone 34, which is of low impedance. This increases the load on the 45-volt battery 37, which will in turn drop the bias on the grid of triode 3 to a low percentage of the original value, due to the current limiting resistor 8. When the bias is dropped to this low value, triode 3 will conduct causing the plate relay consisting of coil 11 and switch 12 to close, thereby actuating coil 1, removing the 45-volt bias cell 37 from the telephone and placing the telephone directly on the line. Resistor 13 is merely a current limiting resistor to protect the coil 1. Capacitor 14 is used to provide a time delay so that the coil 1 will hold for a short time (about 10 seconds) after coil 11 has been deenergized. Capacitor 15 puts a surge into coil 1 and capacitor 14, insuring immediate pull-in when switch 12 is closed by the energization of coil 11. Capacitor 15 is normally charged by the 90-volt battery 41 through switch SW1 and lines 20 and 17 as shown. When switch 12 is closed due to the operation of triode 3, capacitor 15 discharges into coil 11.

Triode 3 will continue to conduct and hold the telephone on the line by switch 2 as long as the handset is off the cradle. As soon as the handset is placed back on the cradle, the line bias rises, and triode 3 will no longer conduct; both relays then open, removing the telephone from the line, and placing the 45-volt bias back on resistor 6 and a proportionally greater bias back on the grid of triode 3.

The next condition to be analyzed is that occasioned by a ringing signal to the telephone. If a ringing circuit is placed on the line, voltage is applied to the grid of triode 3 through capacitor 16, causing triode 3 to conduct and thus placing the telephone on the line due to the energization of coils 11 and 1, similarly to the operation when the handset is lifted from the cradle. The time delay circuit for coil 1 including capacitor 14 holds the telephone on the line long enough for the next ringing signal to again cause triode 3 to conduct.

The choke 18 is placed in the circuit to prevent any audio signal from the service line from getting on the telephone line through capacitor 16 when the handset is on the cradle. This is only for purposes of illustration and any suitable choke device could be used appropriate to the conditions present on the line. In the event of an extremely severe line noise condition, for instance, two chokes may be used instead of one with a capacitor connected to ground from the midpoint of the two chokes.

Resistor 19 shown in FIG. 1 is the standard high impedance grid leak resistor.

The voltage divider network, the grid circuit, and the monitoring device are all high impedance devices and therefore the monitor will produce no loss in volume on the telephone and will be difficult to detect.

It is thus seen that an improved telephone monitor has been disclosed, permitting the monitoring of sound in the vicinity of the telephone while the handset is on the cradle as well as monitoring telephone conversation when the handset is lifted from the cradle.

In addition, this circuit has the ability of monitoring all the pnones on the same line in the event there is more than one phone on the line, such as those found in most modern offices. Any dialing pulses, dial tone, or conversation on any of the phones on the line will be directed through capacitor 16 to the triode, causing it to conduct and to place the primary telephone on the service line, which then allows the audio signal present from any of the other phones on the line to pass through capacitor 9 and into the monitoring device.

What is claimed is:

1. In a telephone monitoring means for connection between a service line and a telephone instrument, said telephone instrument including a cradle and a handset having a microphone: an energizing means, and means for simultaneously disconnecting said microphone from said service line and for connecting said microphone to said energizing means while said handset is on said cradle, so that crosstalk and line noise present in said service line are not transmitted to said microphone during monitoring.

2. The telephone monitoring means of claim 1, further including means coupled to said disconnecting means for reconnecting said microphone to said service line when said handset is lifted from said cradle.

3. In a telephone monitoring means for connection between a service line and a telephone instrument, said telephone instrument including a cradle and a handset having a microphone relay means in said monitoring means normally disconnecting the microphone of said handset from said service line when said handset is on said cradle, and means coupled by said relay means to said microphone for energizing said microphone while said handset is on said cradle, whereby crosstalk and line noise present in said service line is not transmitted to said microphone during monitoring.

4. The telephone monitoring means of claim 3 further including means actuating said relay means for reconnecting said microphone to said service line when said handset is lifted from said cradle.

5. The telephone monitoring means of claim 4 wherein said means actuating said relay means comprises a vacuum tube provided with a control element, and said energizing means for said microphone includes a network coupled to said control element for controlling the bias thereof.

6. The telephone monitoring means of claim 5 further including means connected to said service line and to said control element for applying at least a portion of a ringing signal to said control element whereby a ringing signal will reconnect said telephone instrument to said line.

7. In a telephone monitoring system for use between a service line and a telephone, in which said telephone includes a handset having a microphone, a cradle for holding said handset, and a hook switch in said cradle operated by said handset and having contacts electrically connected to said microphone and to said monitoring system: a switching relay having a coil and a switch arm, said switch arm of said switching relay being connected in one line of said service line for connecting and disconnecting said telephone microphone from said service line, a battery and a first current limiting resistor connected in series and adapted for connection between said switch arm of said switching relay and the other line of said service line when said switch arm of said switching relay is in an opened position, an electron discharge device having a control element, a DC voltage source, a control relay having a coil and a switch arm, said coil of said control relay being connected between said electron discharge device and said DC voltage source, a first and second capacitor connected in series with their common terminal connected to said other line, said first capacitor having its other terminal connected to said switch arm of said control relay, said second capacitor having its other terminal connected to the junction of said DC voltage source and said coil of said control relay, a second current limiting resistor connected in series with said coil of said switching relay, said second current limiting resistor and said coil of said switching relay being connected across said first capacitor, said switch arm of said control relay adapted for connecting said DC source of voltage to said coil of said switching relay, a choke, a voltage dividing network connected across said service line, said network having arm, said choke being connected between said arm and said control element, a third capacitor connected between said one line and said control element for applying ringing signals thereto, and a fourth capacitor for connection between said one line and a high impedance monitor in order to isolate DC voltage therefrom.

8. The telephone monitoring system of claim 7 wherein a first contact of said hook switch is electrically connected to said arm of said switching relay, and a second contact of said hook switch is electrically connected to the junction of said first and second capacitor.

9. The telephone monitoring system of claim 8 further comprising a conducting path across said first and second contacts of said hook switch.

10. In a telephone monitoring system for use between a service line and a telephone, in which said telephone includes a handset having a microphone circuit, a cradle for holding said handset, and a hook switch in said cradle operated by said handset for connecting and disconnecting said microphone circuit from said service line: an energizing means for energizing said microphone circuit when said microphone circuit is disconnected from said service line by said hook switch, relay means for connecting said microphone circuit selectively to said service line or to said energizing means, and means coupled to said relay means for controlling the operation thereof in accordance with the potential across said microphone circuit as determined by the position of the hook switch.